Dec. 28, 1943.   J. H. O'NEIL   2,338,054
CAN BODY COOLING MEANS
Filed Sept. 11, 1942
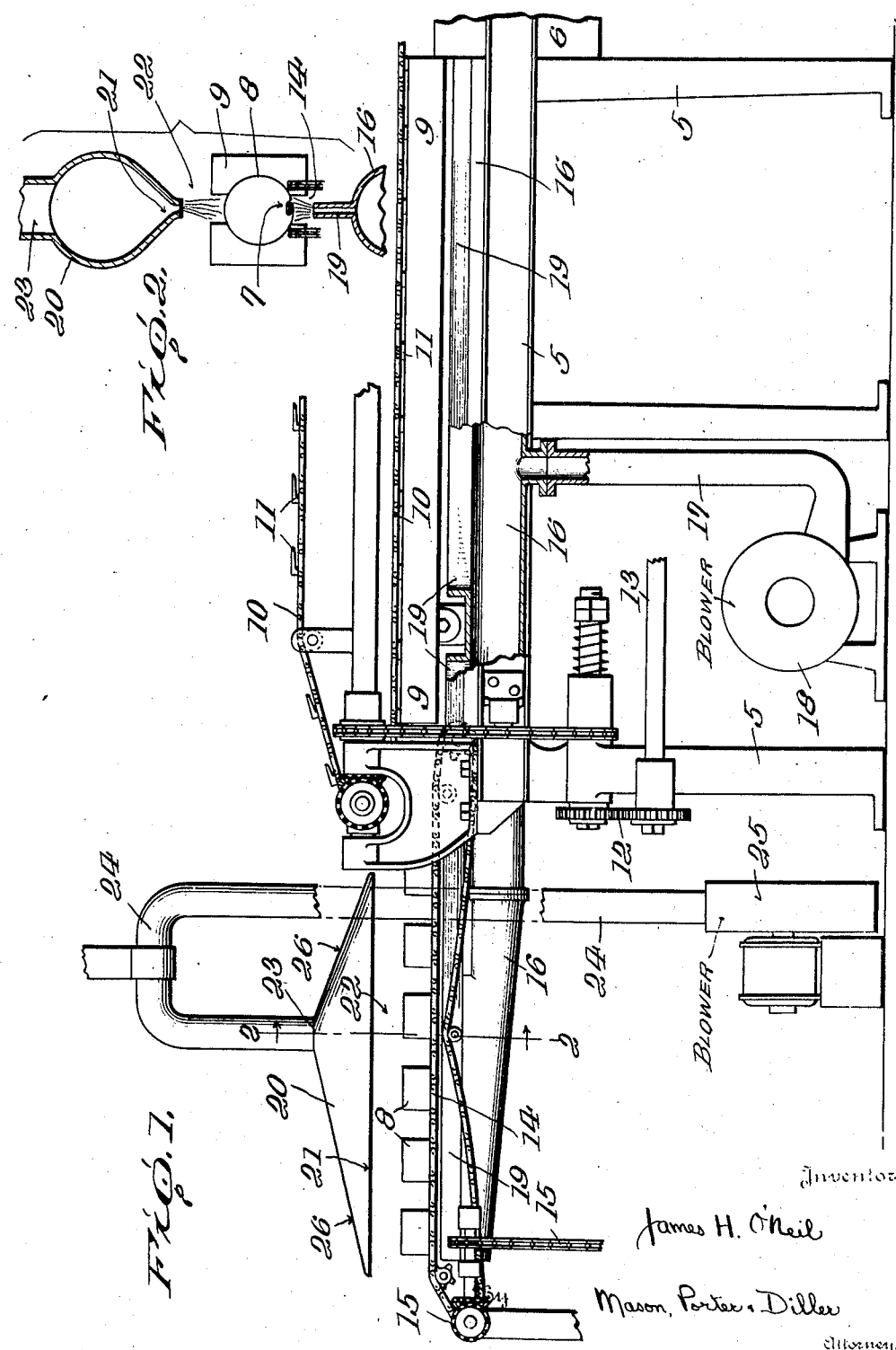

Patented Dec. 28, 1943

2,338,054

UNITED STATES PATENT OFFICE 2,338,054

CAN BODY COOLING MEANS

James H. O'Neil, Syracuse, N. Y., assignor to Continental Can Company, Inc., New York, N. Y., a corporation of New York Application September 11, 1942, Serial No. 458,041

1 Claim. (Cl. 113—98)

The invention relates generally to the art of making metallic receptacles and primarily seeks to provide a novel means for cooling the can bodies which are formed in rapid succession in conventional forms of body makers.

In body makers of the character stated, can body blanks are fed in rapid succession through the various work stations in the machine in which the blanks are first prepared to facilitate forming or shaping of the bodies with the usual side seam structures, then are formed into bodies having side seams. The side seams are bumped in the well known manner to mechanically set them, and then the bodies are passed through the soldering station at which the side seams are solder bonded. At the soldering station the can bodies become quite hot and it is desirable to cool them as rapidly as possible in order quickly to set the solder bond. For a short interval after leaving the soldering station the can bodies travel through an outside horse which serves the twofold purpose of guiding the travel thereof and of confining them in a manner for overcoming any tendency of the side seams to open before the solder bonding has set sufficiently to overcome this opening tendency. While traveling through the outside horse, and for a distance beyond, the can bodies are subjected to a cooling air blast directed upwardly against the solder bonded side seams. It has been found that when the volume of the air blast has been made great enough to assure the desired rapidity of cooling, the blast has frequently displaced cans upwardly off the conveying chains, with resultant jams and losses. When it was attempted to resist this displacing tendency by use of mechanical guides or confining tracks, the guides sometimes marred the travelling can bodies or interfered with proper free movement thereof and with the frequently desirable hand removal of can bodies from the chains for inspection. It is, therefore, an object of the invention to provide novel means for resisting the can body displacing tendency of the cooling air blast, a means which will accomplish this purpose without marring can bodies by mechanical contact and without interfering with desired hand removal of can bodies from the conveying chains, and which will also facilitate the cooling of the can bodies.

In its more detailed nature the invention resides in providing a counterblast of air opposing the upwardly directed cooling air blast and which is effective to overcome the can body displacing tendency of said cooling air blast and also cooperate with the cooling air blast in efficiently cooling the can bodies.

Another object of the invention is to provide a counterblast of air of the character stated which is disposed centrally longitudinally over the can body conveying chains and far enough thereabove to not interfere with hand removal of can bodies from the conveying chains.

With the above and other objects in view that will hereinafter appear, the nature of the invention will be more fully understood by following the detailed description, the appended claim and the several views illustrated in accompanying drawing.

In the drawing,

Figure 1 is a somewhat diagrammatic side elevation and part longitudinal section illustrating a portion of a body maker with the invention mounted thereon.

Fig. 2 is a fragmentary vertical cross section taken on the line 2—2 on Fig. 1.

In the embodiment of the invention disclosed herein, 5 designates a portion of the frame structure of a body maker and 6 the soldering station thereof whereat the side seams 7 of the longitudinally travelling, formed container bodies 8 are solder bonded.

In the conventional manner, the solder bonded can bodies, upon leaving the solder bonding station 6 travel through and are guided by an outside horse 9, being conveyed by an endless conveyor chain 10 having spaced conveyor hooks 11 thereon and being driven as at 12 from a driver shaft 13 forming a part of the body maker structure. It is well known in the art that the outside horse 9 serves the two-fold purpose of guiding the can bodies and confining them in a manner for overcoming any tendency of the side seams to open before the side seam bonding solder has set.

From the end of the outside horse 9 the container bodies 8 deliver onto a pair of laterally spaced block chains 14 which are driven as at 15 from any suitable power source on the machine.

An air duct 16 is disposed below the outside horse 9 and the conveyor chains 14 and extends centrally longitudinally therebeneath. The duct 16 is fed by a duct 17 from a blower 18 which supplies air under pressure to the duct 16, said air being delivered in a sheet blast through a restricted throat 19 directly against the can body side seams for efficiently cooling the same.

All of the parts hereinabove described are conventional and well known in the art. It is well known that when air is directed against the can body side seams through the restricted throat 19 at sufficient velocity to assure the desired rapid cooling of the can bodies, there is a tendency to displace the can bodies upwardly from the conveying chains 14. In efforts to counteract this displacing tendency, guide tracks have been provided, but these have been found objectionable because of marring contacts with the can bodies and the possibility of jamming of can bodies, and also because of interference by these guide tracks with hand removal of can bodies from the chains when it was at times desirable to remove can bodies for inspection purposes.

In order to counteract the displacing tendency of the cooling air blast without experiencing the difficulties above mentioned, and also to facilitate the cooling of the can bodies, a novel means for directing a counterblast of air downwardly against the travelling can bodies has been devised.

For this purpose there is provided a counterblast duct 20 extending longitudinally of the path of travel of the can bodies and spaced a distance thereabove in the manner clearly illustrated in Figs. 1 and 2. The duct delivers the counterblast of air through a restricted, sheet blast throat 21, and the vertical spacing between the bottom extremity of this restricted throat 21 and the travelling can bodies is indicated at 22 in Fig. 1, and is sufficient to facilitate hand removal of the can bodies 8 from the conveying chains 14.

The counterblast 20 has a duct connection or entrance 23 intermediate the ends thereof, and is connected by a duct 24 with blower 25 which supplies air under pressure through said duct 24 to the duct 20 and through the restricted throat 21 of the latter against the upper surfaces of the travelling can bodies in the manner clearly illustrated in Fig. 2.

It will be observed by reference to Fig. 1 of the drawing that the cross section of the duct 20 is gradually reduced from the center toward each end, and this manner of shaping the duct serves to provide substantially uniform velocity of the air blast throughout the length of the restricted throat 21.

It will be obvious that the counterblast of air passing downwardly through the restricted throat 21 against the upper surfaces of the can bodies 8 will not only serve to counteract the upward blast of air through the throat 19 of the lower duct 16, and thus prevent upward displacement of the can bodies from the conveying chains 14, but will also greatly facilitate the cooling of the can bodies.

It is to be understood that the details of construction of the cooperating air blast ducts can be variously changed without departing from the spirit and scope of the invention, as defined in the appended claim.

I claim:

In a body maker, the combination of means for longitudinally conveying can bodies which have just had their side seams solder bonded in the direction of their length so as to dispose said side seams in the direction of travel of said can bodies, a longitudinal duct disposed centrally beneath the longitudinally travelling can bodies, means for delivering air under pressure through said duct for directing said air upwardly in cooling contact with the travelling can bodies at a velocity great enough to constantly tend to displace the can bodies upwardly from said conveying means, a longitudinal duct disposed centrally above the longitudinally travelling can bodies, and means for delivering air under pressure through the last mentioned duct for directing said air downwardly in cooling contact with the travelling can bodies to facilitate cooling thereof and prevent upward displacement of the can bodies from the conveying means by the upwardly directed air, said last mentioned air duct having an air intake intermediate its ends and being progressively diminished in cross sectional area from center to end so as to provide for air delivery at substantially uniform velocity throughout the length of the duct.

JAMES H. O'NEIL.